(12) United States Patent
Scheibli et al.

(10) Patent No.: US 6,241,789 B1
(45) Date of Patent: Jun. 5, 2001

(54) PROCESS FOR DYEING OR PRINTING AND NOVEL REACTIVE DYES

(75) Inventors: Peter Scheibli, Bottmingen; Peter Aeschilmann, Allschwil; Urs Lehmann, Basel; Marcel Frick, Reinach, all of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/541,763

(22) Filed: Apr. 3, 2000

Related U.S. Application Data

(62) Division of application No. 09/207,539, filed on Dec. 8, 1998, now Pat. No. 6,063,137.

(30) Foreign Application Priority Data

Dec. 11, 1997 (EP) .................................................. 97810975

(51) Int. Cl.[7] .............................. D06P 1/382; D06P 3/66; C09B 62/085; C09B 62/028
(52) U.S. Cl. ........................ 8/682; 8/683; 8/684; 8/686; 8/688; 8/920; 8/919; 8/924; 8/918; 8/445; 8/549; 534/638; 534/798; 534/845
(58) Field of Search .................................. 534/638, 798, 534/845; 8/662, 668, 681–684, 445, 919

(56) References Cited

U.S. PATENT DOCUMENTS 2,945,021  7/1960  Fasciati et al. ...................... 260/153

(List continued on next page.)

FOREIGN PATENT DOCUMENTS 0187520  7/1986  (EP) .

(List continued on next page.)

*Primary Examiner*—Margaret Einsmann
(74) *Attorney, Agent, or Firm*—Kevin T. Mansfield

(57) ABSTRACT

Process for dyeing or printing paper, films of plastic or fibre material containing hydroxyl groups or containing nitrogen with reactive dyes, which comprises using at least one reactive dye of the formula (1) from the following group a) and at least one reactive dye from the following groups b), c) and d):

a) green- or blue-dyeing reactive dyes of the formula (1)

b) blue-dyeing reactive dyes of the formula (2) or (3)

c) red-dyeing reactive dyes of the formula (4)

d) yellow- or orange-dyeing reactive dyes of the formula (5)

4 Claims, No Drawings

U.S. PATENT DOCUMENTS

| | | | |
|---|---|---|---|
| 3,043,649 | 7/1962 | Wegmann | 8/54.2 |
| 4,115,378 * | 9/1978 | Bien et al. . | |
| 4,191,687 * | 3/1980 | Austin . | |
| 4,563,518 * | 1/1986 | Henk . | |
| 4,726,844 | 2/1988 | Greenwood | 106/22 |
| 4,906,737 * | 3/1990 | Seiler et al. . | |
| 5,071,442 | 12/1991 | Luttringer et al. | 8/549 |
| 5,163,971 | 11/1992 | Stawitz et al. . | |
| 5,423,888 | 6/1995 | Hildebrand et al. . | |
| 5,709,717 | 1/1998 | Reddig et al. | 8/549 |
| 5,779,740 | 7/1998 | Lehmann et al. | 8/549 |
| 6,114,511 * | 9/2000 | Dannheim . | |

FOREIGN PATENT DOCUMENTS

| | | |
|---|---|---|
| 0755985 | 1/1997 | (EP) . |
| 953622 | 3/1962 | (GB) . |
| 96/24636 | 8/1996 | (WO) . |
| 97/30125 | 8/1997 | (WO) . |
| 99/29782 | 6/1999 | (WO) . |
| 99/31182 | 6/1999 | (WO) . |

* cited by examiner

PROCESS FOR DYEING OR PRINTING AND NOVEL REACTIVE DYES

This is a divisional of application Ser. No. 09/207,539, filed on Dec. 8, 1998 now U.S. Pat. No. 6,063,137.

The present invention relates to a process for dyeing or printing fibre materials containing hydroxyl groups or containing nitrogen with reactive dyes, and to novel reactive dyes. The process on which the present invention is based is also suitable for dyeing or printing paper or films of plastic.

The practice of dyeing and printing with reactive dyes has recently led to increased demands on the quality of the dyeings and prints and on the profitability of the dyeing or printing process. Consequently, there continues to be a need for novel processes which have improved properties in respect of application and in respect of the dyeings or prints obtained.

Processes wherein the reactive dyes have an adequate substantivity and at the same time a good ease of wash off of the non-fixed portions are now required for dyeing and printing. The dyeings and prints furthermore should have a good dyeing yield, high degrees of fixing and good allround properties, such as wet fastness properties and, in particular, light fastness properties. When a combination of reactive dyes is used, the effect of so-called catalytic fading should therefore largely be avoided. By this effect, one of the reactive dyes in combination with other reactive dyes fades significantly more than is the case when it is used by itself, i.e. in an individual shade.

The process should furthermore be suitable for ink jet printing processes jet and ink jet processes).

Ink jet printing processes have already been used in the textile industry for some years. These processes enable the otherwise customary production of a printing screen to be omitted, so that considerable savings in cost and time can be achieved. In the production of pattern samples in particular, changed requirements can be reacted to within a significantly shorter time.

Appropriate ink jet printing processes should have, in particular, optimum use properties. In this connection there may be mentioned properties such as the viscosity, stability, surface tension and conductivity of the inks used. Increased demands are furthermore made on the quality of the resulting prints, for example in respect of colour strength, fibre-dye bond stability and in respect of the wet fastness properties and, in particular, the light fastness properties.

Furthermore, the reactive dyes to be used for the above-mentioned processes should be easy to combine and should allow as far as possible all shades of the colour space to be established by combination.

These requirements are not met in all the properties by the known processes.

The present invention is therefore based on the object of discovering novel, improved processes for dyeing and printing fibre materials which have the qualities characterized above to a high degree.

It has been found that the object described is largely achieved by the process defined below.

The present invention relates to a process for dyeing or printing paper, films of plastic or fibre material containing hydroxyl groups or containing nitrogen with reactive dyes, which comprises using at least one reactive dye of the formula (1) from the following group a) and at least one reactive dye from the following groups b), c) and d):

a) green- or blue-dyeing reactive dyes of the formula (1)

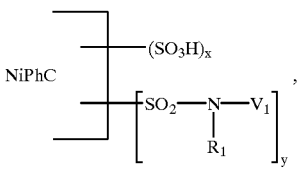

(1)

in which
NiPhC is the radical of a nickel phthalocyanine,
$R_1$ is hydrogen or substituted or unsubstituted $C_1$–$C_4$alkyl,
$V_1$ is hydrogen or substituted or unsubstituted $C_1$–$C_8$alkyl, phenyl or naphthyl and
x is 2 to 4 and y is 1 to 2,
the reactive dye of the formula (1) containing at least one fibre-reactive group;

b) blue-dyeing reactive dyes of the formula (2) or (3)

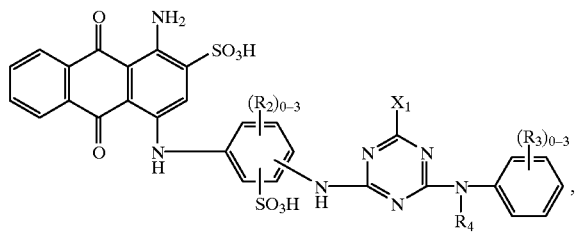

(2)

in which
$(R_2)_{0-3}$ is 0 to 3 $C_1$–$C_4$alkyl radicals which are identical or different from one another and
$(R_3)_{0-3}$ is 0 to 3 substituents, which are identical or different from another, from the group consisting of $C_1$–$C_4$alkyl, $C_1$–$C_4$alkoxy, halogen, carboxyl and sulfo,
$X_1$ is chlorine or fluorine and
R4 is hydrogen or $C_1$–$C_4$alkyl which is unsubstituted or substituted by hydroxyl, sulfo or sulfato,

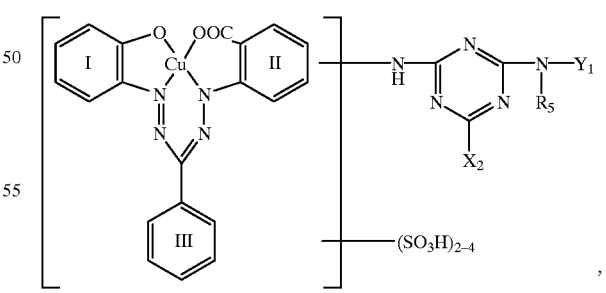

(3)

in which
$R_5$ is hydrogen or $C_1$–$C_4$alkyl which is unsubstituted or substituted by hydroxyl, sulfo or sulfato,
$X_2$ is chlorine or fluorine,
$Y_1$ is hydrogen, $C_1$–$C_8$alkyl which is unsubstituted or substituted by hydroxyl, sulfo or sulfato and uninterrupted or interrupted by oxygen, or phenyl or naphthyl which are unsubstituted or substituted by $C_1$–$C_4$alkyl, $C_1$–$C_4$alkoxy, halogen, carboxyl or sulfo, and the benzene nuclei I, II and III contain no further substituents or are further substituted by $C_1$–$C_4$alkyl, $C_1$–$C_4$alkoxy, halogen or carboxyl;

c) red-dyeing reactive dyes of the formula (4)

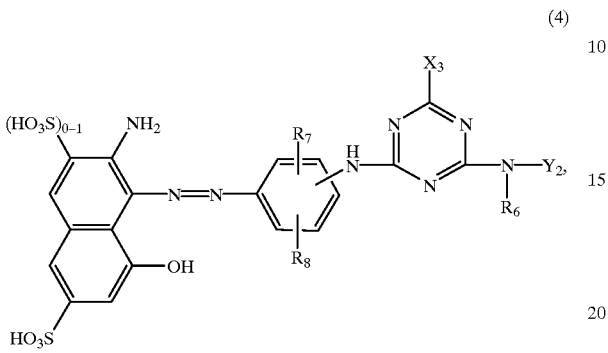

(4)

in which $R_6$ is hydrogen or $C_1$–$C_4$alkyl which is unsubstituted or substituted by hydroxyl, sulfo or sulfato, $R_7$ and $R_8$ independently of one another are hydrogen, $C_1$–$C_4$alkyl, $C_1$–$C_4$alkoxy, halogen, carboxyl or sulfo, $X_3$ is chlorine or fluorine and $Y_2$ is hydrogen, $C_1$–$C_8$alkyl which is unsubstituted or substituted by hydroxyl, sulfo, sulfato or a radical of the formnula —$SO_2$—Z and is uninterrupted or interrupted by oxygen, or phenyl or naphthyl which are unsubstituted or substituted by $C_1$–$C_4$alkyl, $C_1$–$C_4$alkoxy, halogen, carboxyl, sulfo or a radical of the formula —$SO_{,2}$—Z or —CO—NH—$(CH_2)_{2-3}$—$SO_2$—Z, or the radical —N($R_6$)—$Y_2$ is morpholino, in which Z is a radical of the formula —H=$CH_2$ or —$CH_2$—$CH_2$—$U_1$ and $U_1$ is a leaving group;

d) yellow- or orange-yeing reactive dyes of the formula (5)

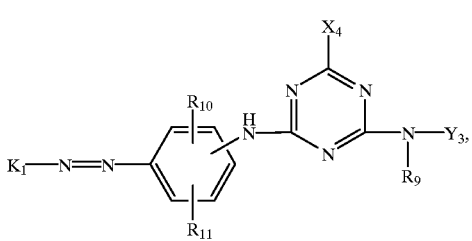

(5)

in which $R_9$ is hydrogen or $C_1$–$C_4$alkyl which is unsubstituted or substituted by hydroxyl, sulfo or sulfato, $R_{10}$ and $R_{11}$ independently of one another are hydrogen, $C_1$–$C_4$alkyl, $C_1$–$C_4$alkoxy, halogen, carboxyl or sulfo, $X_4$ is chlorine or fluorine and $Y_3$ is hydrogen, $C_1$–$C_8$alkyl which is unsubstituted or substituted by hydroxyl, sulfo or sulfato and is uninterrupted or interrupted by oxygen, or phenyl or naphthyl which are unsubstituted or substituted by $C_1$–$C_4$alkyl, $C_1$–$C_4$alkoxy, halogen, carboxyl, sulfo or a halogenotriazinylamino radical which is unsubstituted or further substituted, or the radical —N($R_9$)—$Y_3$ is morpholino, and $K_1$ is a radical of the formula

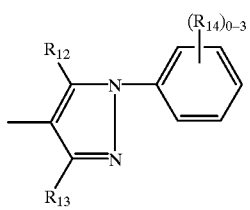

(6)

or

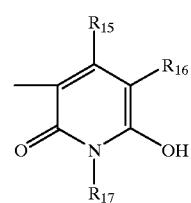

(7)

in which $R_{12}$ is hydroxyl or amino, $R_{13}$ is methyl or carboxyl, $(R_{14})_{0-3}$ is 0 to 3 identical or different substituents from the group consisting of $C_1$–$C_4$alky, $C_1$–$C_4$alkoxy, halogen, carboxyl and sulfo, $R_{15}$ and $R_{17}$ are $C_1$–$C_4$alkyl and $R_{16}$ is cyano, carbamoyl or sulfomethyl.

Sulfo groups present in the above reactive dyes can in general be present both as the free add (—$SO_3H$) and in any salt form, for example as an alkali metal, alkaline earth metal or ammonium salt or as a salt of an organic amine, for example the sodium, potassium, lithium or ammonium salt, the salt of triethanolamine or the mixed salt of two or more different cations, for example as the Na/Li-, Na/$NH_4$- or Na/Li/$NH_4$ mixed salt $C_1$–$C_4$Alkyl $R_1$, $R_2$, $R_3$, $R_4$, $R_5$, $R_6$, $R_7$, $R_8$, $R_9$, $R_{10}$, $R_{11}$, $R_{14}$, $R_{15}$ and $R_{17}$ and the other $C_1$–$C_4$alkyl radicals mentioned above as substituents are, for example, methyl, ethyl, propyl, isopropyl, butyl, secbutyl, tert-butyl or isobutyl, in particular methyl or ethyl. The methyl radicals are of particular importance here. Substituents of the alkyl radical $R_1$ are, for example, hydroxyl, sulfo or sulfato. The alkyl radicals $R_4$, $R_5$, $R_6$ and $R_9$ can be substituted as mentioned above. Preferably, the alkyl radicals mentioned are unsubstituted.

$C_1$–$C_4$Akoxy $R_3$, $R_7$, $R_8$, $R_{10}$, $R_{11}$, and $R_{14}$ and the other $C_1$–$C_4$alkoxy radicals mentioned above as substituents are, for example, methoxy, ethoxy, propoxy, isopropoxy, butoxy or isobutoxy, in particular methoxy.

Halogen $R_3$, $R_7$, $R_8$, $R_{10}$, $R_{11}$, and $R_{14}$ and the other halogen radicals mentioned above as substituents are, for example, fluorine or, in particular, chlorine.

The leaving group $U_1$ is, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N$(C_1$–$C_4$alkyl$)_2$. Preferably, $U_1$ is a group of the formula —Cl, —$OSO_3H$, —$SSO_3H$, —OCO—$CH_3$, —OCC—$C_6H_5$ or —$OPO_3H_2$, in particular —Cl or —$OSO_3H$ and particularly preferably —$OSO_3H$.

Z is preferably vinyl or a radical of the formula —$CH_2$-$CH_2$—$OSO_3H$.

Substituted or unsubstituted $C_1$–$C_8$alkyl $V_1$ is, in particular, $C_1$–$C_4$alkyl, and preferably ethyl, the alkyl radicals being unsubstituted or preferably substituted by a fibre-reactive group.

Unsubstituted or substituted phenyl or naphthyl $V_1$ are the unsubstituted radicals and, preferably, the radicals substituted by, for example, $C_1$–$C_4$alkyl, $C_1$–$C_4$alkoxy, halogen, carboxyl, sulfo or a fibre-reactive group. Those phenyl or naphthyl radicals which are substituted by a fibre-reactive group and furthermore may be substituted by sulfo are of particular interest The corresponding phenyl radicals are of very particular interest here for $V_1$.

Fibre-reactive groups which are contained in the reactive dye of the formula (1) are, for example, those of the formula

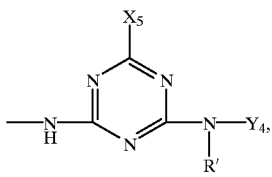
(8a)

—$SO_2$—Z (8b) or
—CO—NH—$(CH_2)_{2-3}$—$SO_2Z$ (8c)
in which

R' is hydrogen or $C_1$–$C_4$alkyl, in particular hydrogen, $X_5$ is fluorine or, in particular, chlorine, $Y_4$ is as defined above for $Y_1$, and is preferably hydrogen or phenyl which is unsubstituted or substituted by $C_1$–$C_4$alkyl, $C_1$–$C_4$alkoxy, halogen, carboxyl or sulfo, and Z is as defined and preferred above.

Preferably, $V_1$ is a radical of the formula

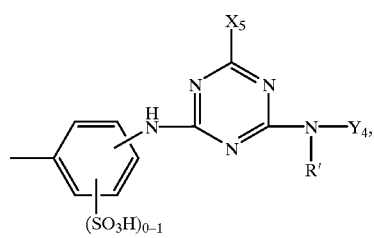
(9a)

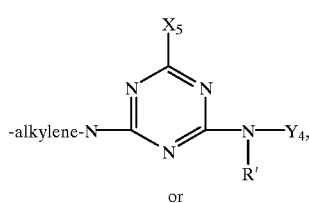
(9b)

or

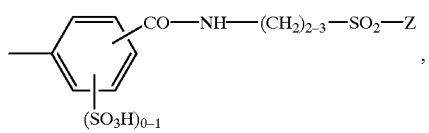
(9c)

in which

R' Is hydrogen or $C_1$–$C_4$alkyl, in particular hydrogen, $X_5$ is fluorine or, in particular, chlorine, $Y_4$ is hydrogen or phenyl which is unsubstituted or substituted by $C_1$–$C_4$alkyl, $C_1$–$C_4$alkoxy, halogen, carboxyl or sulfo, in particular hydrogen or phenyl which is substituted by sulfo, alkylene is $C_2$–$C_6$alkylene, in particular $C_2$–$C_4$alkylene, and preferably ethylene, and Z is as defined and preferred above.

$V_1$ is particularly preferably a radical of the formula (9a) or (9b), in particular a radical of the formula (9a).

Preferred reactive dyes of the formula (1) are those in which $R_1$ is hydrogen or $C_1$–$C_4$alkyl, in particular hydrogen, and $V_1$ is as defined and preferred above.

Particularly preferred reactive dyes of the formula (1) are those of the formula

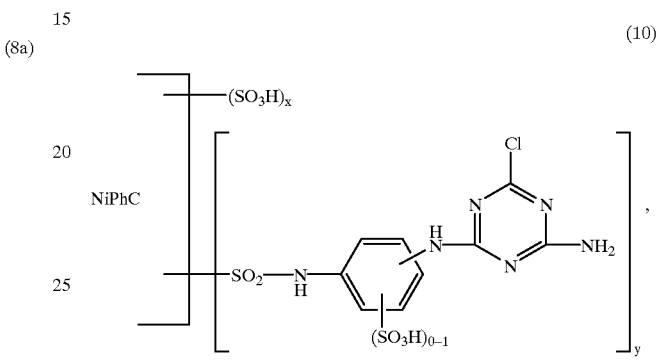
(10)

in which NiPhC, x and y are as defined above.

$R_2$ is preferably methyl.

$R_3$ is preferably $C_{1-4}$alkyl, $C_1$–$C_4$alkoxy or sulfo, in particular sulfo.

$X_1$ is preferably chlorine.

$R_4$ is preferably hydrogen or $C_1$–$C_4$alkyl, in particular hydrogen.

Preferred reactive dyes of the formula (2) are those in which $R_3$ is sulfo, $R_4$ is hydrogen or $C_1$–$C_4$alkyl and $X_1$ is chlorine. Preferably, the reactive dyes of the formula (2) contain three radicals $R_2$.

Particularly preferred reactive dyes of the formula (2) are those of the formula

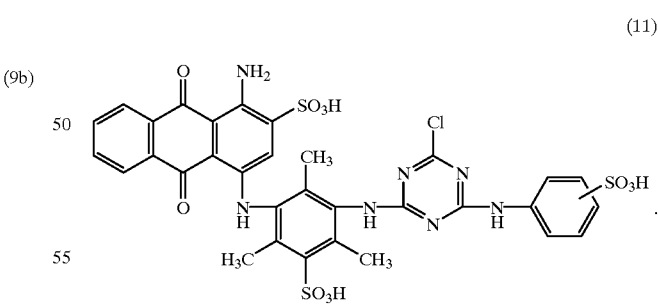
(11)

$R_5$ is preferably hydrogen or $C_1$–$C_4$alkyl, in particular hydrogen.

$X_2$ is preferably chlorine.

$Y_1$ is preferably hydrogen or $C_1$–$C_8$alkyl which is unsubstituted or substituted by hydroxyl, sulfo or sulfato and is uninterrupted or interrupted by oxygen, and in particular is hydrogen.

The benzene nuclei I, II and III of the reactive dye of the formula (3) preferably contain no further substituents.

Preferred reactive dyes of the formula (3) are those in which
$R_5$ is hydrogen or $C_1$–$C_4$alkyl, in particular hydrogen,
$X_2$ is chlorine and
$Y_1$ is hydrogen.

Particularly preferred reactive dyes of the formula (3) are those of the formula

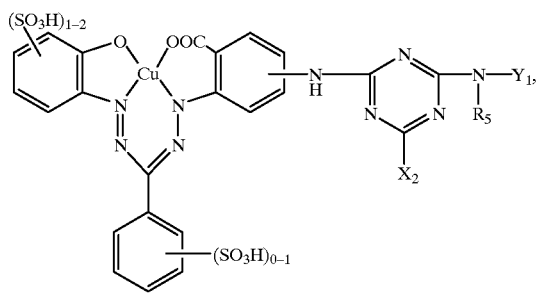
(12)

in which
$R_5$ is hydrogen or $C_{1-4}$alkyl, in particular hydrogen, and
$X_2$ and $Y_1$ are as defined and preferred above.

Especially preferred reactive dyes of the formula (3) are those of the formula

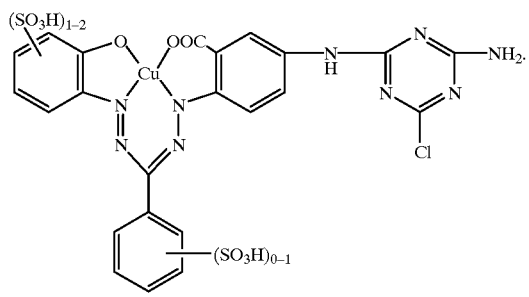
(13)

$R_6$ is preferably hydrogen or $C_{1-4}$alkyl, in particular $C_1$–$C_4$alkyl and preferably methyl.
$R_7$ is preferably sulfo.
$R_8$ is preferably hydrogen or sulfo, in particular hydrogen.
$X_3$ is preferably chlorine.
$Y_2$ is preferably hydrogen, $C_1$–$C_8$alkyl, in particular $C_1$–$C_4$alkyl which is unsubstituted or substituted by hydroxyl, sulfo or sulfato and is uninterrupted or interrupted by oxygen, or phenyl or naphthyl which are unsubstituted or substituted by $C_1$–$C_4$alkyl, $C_1$–$C_4$alkoxy, halogen, carboxyl or sulfo, or the radical —N($R_6$)—$Y_2$ is morpholino.
$Y_2$ is particularly preferably $C_1$–$C_4$alkyl which is unsubstituted or substituted by hydroxyl, sulfo or sulfato, in particular by sulfo, and is uninterrupted or interrupted by oxygen, or phenyl which is unsubstituted or substituted by $C_1$–$C_4$alkyl, $C_1$–$C_4$alkoxy, halogen, carboxyl or sulfo, in particular by sulfo.
$Y_2$ is especially preferably $C_1$–$C_4$alkyl which is unsubstituted or substituted by hydroxyl, sulfo or sulfato, in particular by sulfo.

Preferred reactive dyes of the formula (4) are those in which
$R_6$ is hydrogen or $C_1$–$C_4$alkyl, in particular $C_1$–$C_4$alkyl, and preferably methyl,
$R_7$ is sulfo,
$R_8$ is hydrogen or sulfo, in particular hydrogen,
$X_3$ is fluorine or, in particular, chlorine, and
$Y_2$ is hydrogen, $C_1$–$C_8$alkyl which is unsubstituted or substituted by hydroxyl, sulfo or sulfato and is uninterrupted or interrupted by oxygen, or phenyl or naphthyl which are unsubstituted or substituted by $C_1$–$C_4$alkyl, $C_1$–$C_4$alkoxy, halogen, carboxyl or sulfo, or the radical —N ($R_6$)—$Y_2$ is morpholino. In this case, $Y_2$ is as preferred above.

Particularly preferred reactive dyes of the formnula (4) are those of the formula

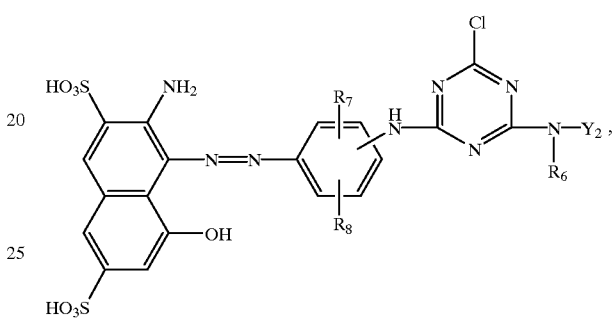
(14)

in which
$R_6$ is hydrogen or $C_1$–$C_4$alkyl, in particular $C_{1-4}$alkyl, and preferably methyl,
$R_7$ is sulfo,
$R_8$ is hydrogen or sulfo, in particular hydrogen, and
$Y_2$ is $C_1$–$C_4$alkyl which is substituted by hydroxyl, sulfo or sulfato, in particular by sulfo, and is uninterrupted or interrupted by oxygen, or is phenyl which is unsubstituted or substituted by
$C_1$–$C_4$alkyl, $C_1$–$C_4$alkoxy, halogen, carboxyl or sulfo. $Y_2$ here is as preferred above.

Especially preferred reactive dyes of the formula (4) are those of the formula

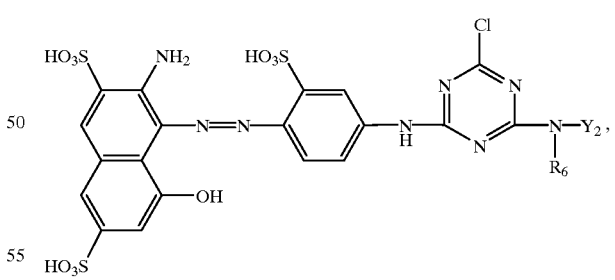
(15)

in which
$R_6$ is hydrogen or $C_1$–$C_4$alkyl, in particular $C_1$–$C_4$alkyl, and preferably methyl, and
$Y_2$ is $C_1$–$C_4$alkyl which is substituted by hydroxy, sulfo or sulfato, in particular by sulfo.
$R_6$ is preferably hydrogen or $C_1$–$C_4$alkyl, in particular hydrogen.
$R_{10}$ is preferably sulfo.
$R_{11}$ is preferably hydrogen or sulfo, in particular hydrogen.

$X_4$ is preferably chlorine.
$R_{12}$ is preferably hydroxyl.
$R_{13}$ is preferably methyl
$R_{14}$ is preferably halogen or sulfo.
$R_{15}$ is preferably methyl and
$R_{17}$ is preferably ethyl.
$R_{16}$ is, in particular, carbamoyl or sulfomethyl, preferably carbamoyl.

The radical $K_1$ is preferably a radical of the formnula (6).

$Y_3$ is preferably naphthyl or, in particular, phenyl which are unsubstituted or substituted by $C_1$–$C_4$alkyl, $C_1$–$C_4$alkoxy, halogen, carboxyl, sulfo or a halogenotriazinylamino radical which is unsubstituted or further substituted. A halogenotriazinylamino radical which is unsubstituted or further substituted is, for example, such a radical of the formula (8a), in which the substituents are as defined and preferred under formula (8a) and $Y_4$ is, in particular, hydrogen.

$Y_3$ is particularly preferably phenyl which is subs ted by sulfo or a radical of the formula (8a), in particular phenyl which is substituted by sulfo.

Preferred reactive dyes of the formula (5) are those in which $R_9$ is hydrogen or $C_1$–$C_4$alkyl, in particular hydrogen, $R_{10}$ is sulfo, $R_{11}$ is hydrogen or sulfo, in particular hydrogen, $R_{12}$ is hydroxyl, $R_{13}$ is methyl, $R_{16}$ is carbamoyl and $X_4$ is chlorine.

Particularly preferred reactive dyes of the formula (5) are those of the formula which are used are those of the formula (14), in particular of the formula (15), and reactive dyes of group d) which are used are those of the formula (16) or (17), in particular of the formula (16).

Reactive dyes of group b) which are used are, in particular, a mixture of reactive dyes of the formulae (2) and (3), the reactive dyes of the formulae (2) and (3) being as defined and preferred above.

Preferably, at least one reactive dye of the formula (1) from group a) and at least one reactive dye of the formula (4) from group c) are used.

Preferably, furthermore, at least one reactive dye of the formula (1) from group a) and at least one reactive dye of the formula (5) from group d) are used.

Particularly preferably, at least one reactive dye of the formula (1) from group a), at least one reactive dye of the formula (4) from group c) and at least one reactive dye of the formula (5) from group d) are used.

According to an especially preferred embodiment of the process according to the invention,
- at least one reactive dye of the formula (1) from group a),
- at least one reactive dye of the formula (2) or (3) from group b),
- at least one reactive dye of the formula (4) from group c) and
- at least one reactive dye of the formula (5) from group d) are used.

The process according to the invention is suitable for dyeing or printing fibre materials containing hydroxyl groups or containing nitrogen.

The process according to the invention is furthermore suitable for dyeing or printing paper or films of plastic.

Examples of nitrogen-containing fibre materials are natural polyamide materials, for example wool, or synthetic polyamide materials, for example polyamide 6 or polyamide 6.6.

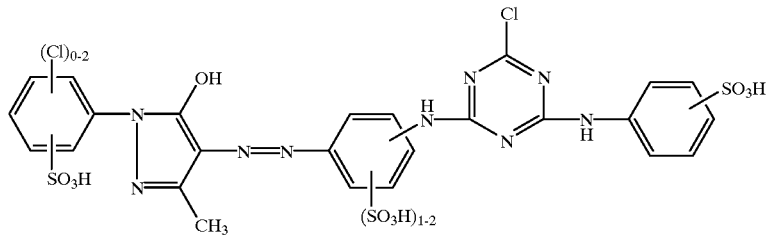

(16)

or

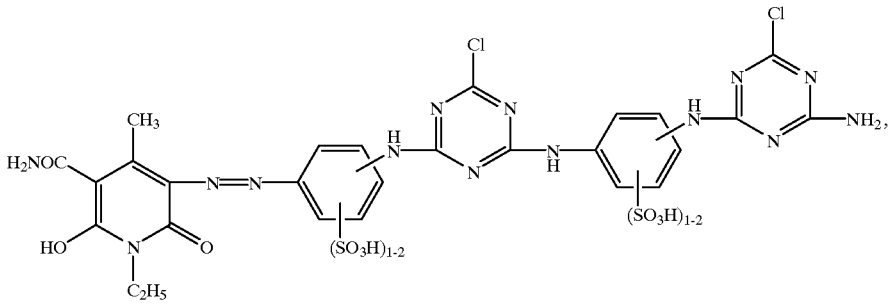

(17)

in particular those of the formula (16).

Preferably, reactive dyes of group a) which are used are those of the formula (10), reactive dyes of group b) which are used are those of the formula (11) or (12), in particular those of the formula (11) or (13), reactive dyes of group c)

Fibre materials containing hydroxyl groups, in particular cellulosic fibre materials made entirely or partly of cellulose, are preferred for the process according to the invention. Examples are natural fibre materials, such as cotton, linen or hemp, and pulp and regenerated fibre materials, for example viscose and lyocell. Viscose or, preferably, cotton are particularly preferred here.

The fibre materials mentioned are preferably in the form of textile fibre materials, in particular as flat textile woven fabric, knitted fabric or webs.

Examples of paper which can be dyed or printed by the process according to the invention are commercially available ink jet paper, photo paper, glossy paper, paper coated with plastic, for example Epson Ink Jet Paper, Epson Photo Paper, Epson Glossy Film, HP Special Ink-Jet Paper, Encad Photo Gloss Paper and Ilford Photo Paper. Films of plastic which can be dyed or printed by the process according to the invention are, for example, transparent or milky/opaque. Suitable films of plastic are, for example, 3M Transparency Film.

According to one embodiment of the process according to the invention, the dyeing or printing can be carried out by the customary dyeing or printing processes. The dye liquors or printing pastes here can comprise, in addition to water and the dyes, further additives, for example wetting agents, antifoams, levelling agents or agents which affect the nature of the substrate, for example of the textile material, for example softening agents, additives for flameproofing or dirt-, water- and oil-repellant agents, as well as water-softening agents and natural or synthetic thickeners, for example alginates and cellulose ethers.

Dyeing by the exhaust method or the pad-dyeing method are preferred for the process according to the invention. The methods mentioned are preferably suitable for dyeing fibre materials containing hydroxyl groups or containing nitrogen.

According to the exhaust method, dyeing is as a rule carried out in an aqueous medium at a liquor ratio of, for example, 1:2 to 1:60, in particular a liquor ratio of 1:5 to 1:20, and a temperature of 20 to 105° C., in particular 30 to 90° C., and preferably 30 to 70° C.

The amounts in which the reactive dyes are used here in the dyebaths can vary according to the desired depth of shade, and in general amounts of 0.01 to 10% by weight, in particular 0.01 to 6% by weight, based on the goods to be dyed, have proved advantageous.

According to the pad-dyeing method, the goods are as a rule impregnated with aqueous dye solutions, which may contain salts. The liquor pick-up here is, for example, 20 to 150%, in particular 40 to 120%, and preferably 50 to 100%, based on the weight of the fibre material to be dyed. If appropriate, the liquor already comprises fixing alkali, or the fibre material is treated with fixing alkali after the impregnation. Alkalis are, for example, sodium carbonate, sodium bicarbonate, sodium hydroxide, disodium phosphate, trisodium phosphate, borax, aqueous ammonia, sodium trichloroacetate, sodium formate or a mixture of water-glass and an aqueous sodium carbonate solution. Alkali metal hydroxide and/or alkali metal carbonate, in particular sodium hydroxide and/or sodium carbonate, are preferred here.

Fixing can be carried out, for example, by the action of heat, such as by steaming the impregnated fibre material at a temperature of, for example, 100 to 120° C., preferably in saturated steam. According to the so-called cold pad-batch process, the dye is applied on the padder together with the alkali and thereafter is fixed at room temperature by storage for several hours, for example 3 to 40 hours. After the fixing, the dyeings or prints are rinsed thoroughly, if appropriate with the addition of a dispersing agent Printing is particularly preferred for the process according to the invention. Examples of corresponding printing processes are conventional printing, screen printing and ink jet printing processes.

Ink jet printing processes are especially preferred for the process according to the invention.

For printing fibre materials, inks which comprise a total content of reactive dyes of, for example, 3 to 35% by weight, in particular 5 to 35% by weight, and preferably 10 to 30% by weight, based on the total weight of the ink, are as a rule used.

For printing paper or films of plastic, inks which comprise a total content of reactive dyes of, for example, 1 to 30% by weight, in particular 1.5 to 25% by weight, and preferably 2 to 20% by weight, based on the total weight of the ink, are as a rule used.

The reactive dyes used in the inks should preferably have a low salt content, i.e. comprise a total content of salts of less than, for example, 0.5% by weight, based on the weight of the dyes. Reactive dyes which, because of their preparation and/or the subsequent addition of diluents, comprise higher salt contents can be desalinated, for example, by membrane separation processes, such as ultrafiltration, reverse osmosis or dialysis.

The inks can furthermore also comprise water-soluble, nonionic cellulose ethers, for example methyl-, ethyl-, hydroxyethyl-, methylhydroxyethyl-, hydroxypropyl- or hydroxypropylmethylcellulose. Methylcellulose or, in particular, hydroxyethylcellulose are preferred. The cellulose ethers can usually be used in the ink in an amount of 0.01 to 2% by weight, in particular 0.01 to 1% by weight, and preferably 0.01 to 0.5% by weight, based on the total weight of the ink.

The inks can furthermore comprise alginates, in particular alkali metal alginates, and preferably sodium alginate. These can usually be used in the ink in an amount of 0.01 to 2% by weight, in particular 0.01to 1% by weight, and preferably 0.01 to 0.5% by weight, based on the total weight of the ink.

The inks preferably have a viscosity of 1 to 40 mPa.s.

The inks can furthermore comprise buffer substances, for example borax, borate or citrate. Examples are sodium borate, sodium tetraborate and sodium citrate. They can be used, in particular, in amounts of 0.1to 3% by weight, preferably 0.1to 1% by weight, based on the total weight of the ink, in order to establish a pH of, for example, 5 to 9, in particular 6 to S. The inks can comprise, as further additives, for example, N-methyl-2-pyrrolidone or, in particular, 1,2-propylene glycol. These can usually be used in the ink in an amount of 5 to 30% by weight, in particular 5 to 20% by weight, and preferably 10 to 20% by weight, based on the total weight of the ink.

If desired, the inks can furthermore also comprise customary additives, for example foam suppressing agents or, in particular, substances which inhibit the growth of fungi and/or bacteria. These are usually used in amounts of 0.01 to 1% by weight, based on the total weight of the ink.

The process according to the invention for printing by the ink jet printing process can be carried out with ink jet printers which are suitable for textile printing and are known per se.

In the case of the ink jet printing process, individual drops of the ink are sprayed in a controlled manner onto a substrate from a nozzle. The continuous ink jet method and the drop on demand method are usually used for this. In the case of the continuous ink jet method, the drops are generated continuously, drops which are not required for printing being diverted to a collecting container and recycled. In the case of the drop on demand method, on the other hand, drops are generated and printed as required, i.e. drops are only generated when required for printing. The drops can be generated, for example, by means of a piezo ink jet head or by means of thermal energy (bubble jet). Printing by the drop on demand method, in particular by means of a piezo ink jet head, is preferred for the process according to the invention.

According to a preferred embodiment of the process according to the invention for printing by the ink jet printing process, the fibre material is pretreated before the printing, during which the fibre material to be printed is first treated with an aqueous alkaline liquor and, if appropriate, the treated fibre material is dried.

The aqueous alkaline liquor comprises at least one of the customary bases employed for fixing reactive dyes in conventional reactor printing processes. The base is employed, for example, in an amount of 10 to 100 g/l of liquor, preferably 10 to 50 g/l of liquor. Bases are, for example, sodium carbonate, sodium hydroxide, disodium phosphate, trisodium phosphate, sodium acetate, sodium propionate, sodium bicarbonate, aqueous ammonia or alkali donors, for example sodium chloroacetate or sodium formate. Sodium bicarbonate, sodium carbonate or a mixture of water-glass and sodium carbonate is preferably used. The pH of the alkaline liquor is as a rule 7.5 to 13.5, preferably 8.5 to 12.5. In addition to the bases, the aqueous alkaline liquor can comprise further additives, for example hydrotropic agents. Urea is preferably used as the hydrotropic agent, and is employed, for example, in an amount of 25 to 200 g/l of liquor, preferably 50 to 150 g/l of liquor. The fibre material is preferably dried after the other pretreatment After the printing by the ink jet printing process, the fibre material is advantageously dried, preferably at temperature of up to 150° C., in particular 80 to 120° C., and is then subjected to a heat treatment process in order to complete the printing or to fix the dye.

The heat treatment can be carried out, for example, by a hot pad-batch process, a thermosol process or, preferably, by a steaming process.

In the steaming process, the printed fibre material is subjected, for example, to a treatment in a steamer with steam, which may be superheated, advantageously at a temperature of 95 to 180° C., advantageously in saturated steam.

Thereafter, the printed fibre material is as a rule washed out with water in the customary manner in order to remove non-fixed dye.

The dyeings and prints obtainable by the process according to the invention have good all round properties; they have, for example, a high fibre-ye bond stability both in the add and in the alkaline range, good wet fastness properties, such as fastness to washing, water, saltwater, crossdyeing and perspiration, a good fastness to chlorine, fastness to rubbing, fastness to ironing and fastness to pleating, as well as sharp contours and a high colour strength. The very good fastness to light is furthermore to be emphasized.

The present invention furthermore relates to reactive dyes of the formula (4a)

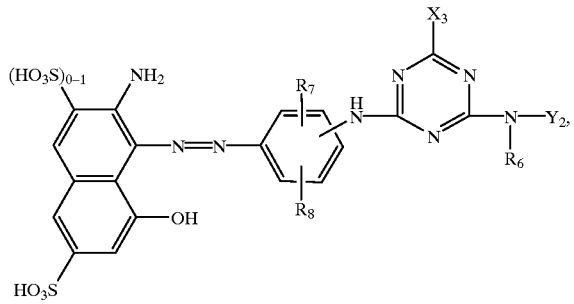

in which $R_6$ is hydrogen or $C_1$–$C_4$alkyl which is unsubstituted or substituted by hydroxyl, sulfo or sulfato, $R_7$ and $R_8$ independently of one another are hydrogen, $C_1$–$C_4$allyl, $C_1$–$C_4$alkoxy, halogen, carboxyl or sulfo, $X_3$ is fluorine and $Y_2$ is hydrogen, $C_1$–$C_4$alkyl which is unsubstituted or substituted by hydroxyl, sulfo or sulfato and is uninterrupted or interrupted by oxygen, or phenyl or naphthyl which are unsubstituted or substituted by $C_1$–$C_4$alkyl, $C_1$–$C_4$alkoxy, halogen, carboxyl or sulfo, or the radical —N($R_6$)—$Y_2$ is morpholino.

The individual subsfituents and the reactive dyes of the formula (4a) are as preferred above.

The present invention furthermore relates to a process for the preparation of the reactive dyes of the formula (4a), which comprises subjecting a compound of the formula (18)

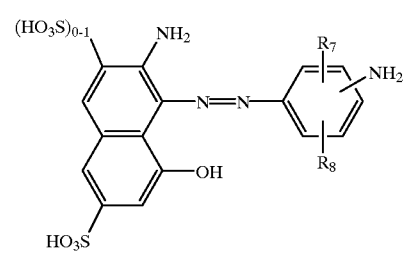

to a condensation reaction with a compound of the formula (19)

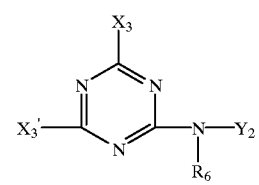

or subjecting a compound of the formula (18) to a condensation reaction with cyanuric chloride or cyanuric fluoride and then subjecting the resulting product to a condensation reaction with a compound of the formula (20)

in which $R_6$, $R_7$, $R_8$, $Y_2$ and $X_3$ are as defined under formula (4a) and $X_3'$ is as defined for $X_3$ under formula (4a).

The individual condensation reactions are carried out, for example, by processes which are known per se, as a rule in aqueous solution, at a temperature of, for example, 0 to 50° C., in particular 0 to 30° C., and a pH of, for example, 3 to 10, in particular 3 to 8.

The further reactive dyes used for the process according to the invention are known or can be prepared analogously to known dyes.

Thus, for example, reactive dyes of the formula (1) can be obtained by subjecting a compound of the formula

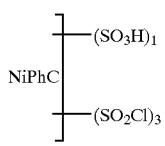

to a condensation reaction with a compound of the formula

in which

NiPhC, $R_1$ and $V_1$ are as defined under formula (1).

The condensation reaction is carried out, for example, according to processes which are known per se, as a rule in aqueous solution, at a temperature of, for example, 0 to 50° C., in particular 0 to 30° C., and a pH of, for example 3 to 10, in particular 3 to 8.

If appropriate, further condensation reactions can follow. Thus, for example, if the radical $V_1$ of the compound of the formula (22) contains a further amino group, this amino group can be subjected to a condensation reaction with cyanuric chloride or cyanuric fluoride. Thereafter, an amino radical can be introduced by condensation into the cyanuric chloride or cyanuric fluoride radical of the intermediate thus obtained. The individual condensation reactions can be carried out, for example, as described above.

The present invention furthermore relates to dye mixtures which comprise at least one reactive dye of the formnula (2)

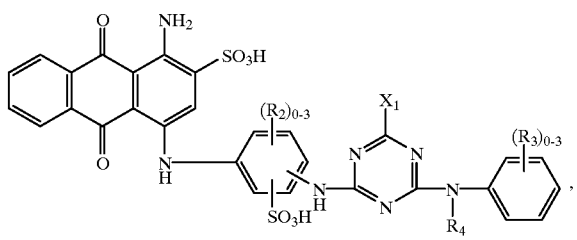

in which $(R_2)_{0-3}$ is 0 to 3 $C_1$–$C_4$alkyl radicals which are identical or different from one another and $(R_3)_{0-3}$ is 0 to 3 substituents, which are identical or different from another, from the group consisting of $C_1$–$C_4$alkyl, $C_1$–$C_4$alkoxy, halogen, carboxyl and sulfo, $X_1$ is chlorine or fluorine and $R_4$ is hydrogen or $C_1$–$C_4$alkyl which is unsubstituted or substituted by hydroxyl, sulfo or sulfato, and at least one reactive dye of the formula (3)

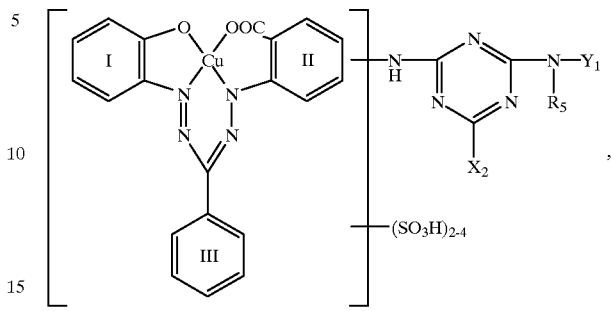

in which $R_5$ is hydrogen or $C_1$–$C_4$alkyl which is unsubstituted or substituted by hydroxyl, sulfo or sulfato, $X_2$ is chlorine or fluorine, $Y_1$ is hydrogen, $C_1$–$C_1$alkyl which is unsubstituted or substituted by hydroxyl, sulfo or sulfato and uninterrupted or interrupted by oxygen, or phenyl or naphthyl which are unsubstituted or substituted by $C_1$–$C_4$alkyl, $C_1$C_4$alkoxy, halogen, carboxyl or sulfo, and the benzene nuclei I, II and III contain no further substituents or are further substituted by $C_1$–$C_4$alkyl, $C_1$–$C_4$alkoxy, halogen or carboxyl.

The reactive dyes of the formulae (2) and (3) here are as preferred above.

The dye mixtures according to the invention preferably comprise reactive dyes of the formula (11) as those of the formula (2).

The dye mixtures according to the invention preferably comprise reactive dyes of the formula (12), in particular of the formula (13), as those of the formula (3).

Dye mixtures which comprise a reactive dye of the formula (11) and a reactive dye of the formula (12), in particular a reactive dye of the formula (13), are of particular interest The reactive dyes of the formulae (2) and (3) are present in the dye mixture, for example, in a weight ratio of 1:99 to 99:1, preferably 10:90 to 90:10, and particularly preferably 20:80 to 80:20.

The dye mixtures according to the invention can be prepared, for example, by mixing the individual dyes. This mixing process is carried out, for example, in suitable mills, for example bead or pinned disk mills, and in kneaders or mixers.

The reactive dyes of the formula (4a) according to the invention and the dye mixtures according to the invention of the reactive dyes of the formulae (2) and (3) give dyeings and prints with good allround properties; they have, for example, a high fibre-dye bond stability both in the acid and in the alkaline range, a good fastness to light and good wet fastness properties, such as fastness to washing, water, saltwater, crossdyeing and perspiration, a good fastness to chlorine, fastness to rubbing, fastness to ironing and fastness to pleating, and sharp contours and a high colour strength. The reactive dyes of the formula (4a) and the dye mixtures of the reactive dyes of the formulae (2) and (3) are particularly suitable in the process according to the invention.

In the following examples, parts are by weight. The temperatures are degrees Celsius. Parts by weight bear the same relation to parts by volume as the gram to the cubic centimetre.

PREPARATION EXAMPLE 1 a) 21.8 parts of 4-nitroaniline-2-sulfonic add are stirred into 350 parts of hot water and the mixture is rendered neutral with an aqueous sodium hydroxide solution (30%). 6.9 parts of sodium nitrite are added to this solution and the mixture is stirred until solution is complete. This solution is added dropwise at a temperature of 0° C. to a mixture of 100 parts of ice and 25 parts of hydrochloric acid (30%). When a nitrite excess is visible on potassium iodide paper, the mixture is subsequently stirred at a temperature of 0 to 2° C. for half an hour and the excess nitrite is destroyed by addition of sulfamic add solution.

b) In a separate operation, 31.9 parts of sulfo-gamma add in 125 parts of water are rendered neutral with 4 parts of sodium hydroxide and dissolved to give a clear solution. This sulfo-gamma add solution is slowly metered into the solution prepared as described above under a). Formation of the dyestuff takes place immediately, and is brought to completion by increasing the pH to a value of 2.0 by addition of an aqueous sodium acetate solution. A solution which comprises the compound, shown in the form of the free acid, of the formula

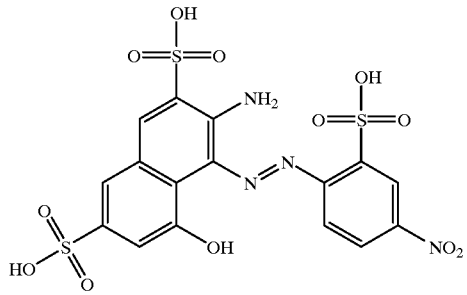

(101)

is obtained.

c) The solution prepared as described under b) of the compound of the formula (101) is heated to a temperature of 40° C. and brought to a pH of 9 with sodium hydroxide. The following solution is now added dropwise at a temperature of about 40° C. in the course of one hour: 40.9 parts of sodium sulfide and 7.1 parts of elemental sulfur, dissolved in 250 parts of hot water at 80° C.

The pH is kept at a value of 9.0 by metering in hydrochloric acid solution. The end point is determined by means of thin layer chromatography. The resulting compound is precipitated out by addition of 140 parts of sodium chloride, filtered off and washed with a 10% aqueous sodium chloride solution. A compound which, in the form of the free acid, has the formula

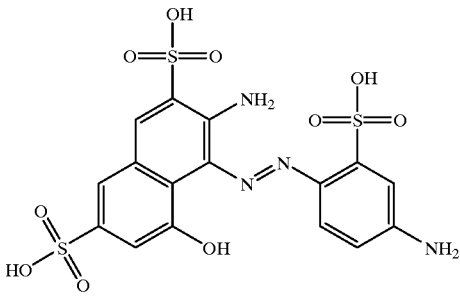

(102)

is obtained.

d) 1.84 parts of cyanuric chloride are stirred intensively in 50 parts of ice-water together with 0.1part of a surface-active auxiliary and 0.2 part of disodium hydrogen phosphate. 2.53 parts of aniline-2,5disulfonic add are added. The temperature is kept constantly at 0° C. The pH is increased to 4.0 with aqueous sodium hydroxide solution and kept constant until a test chromatogram no longer indicates uncondensed aniline-2,5-disulfonic acid. 5.18 parts of the compound of the formula (102) obtained according to c) are now added, the pH is brought to 7.0 and the reaction mixture is heated to 30° C. and kept constant under these conditions until a chromatogram no longer indicates non-condensed compound of the formula (102). A chromatographically uniform solution of the reactive dye of the formula (103) shown below is obtained. After addition of sodium chloride, the dye is precipitated out, filtered off and dried. A reactive dye which, in the form of the free acid, is the compound of the formula

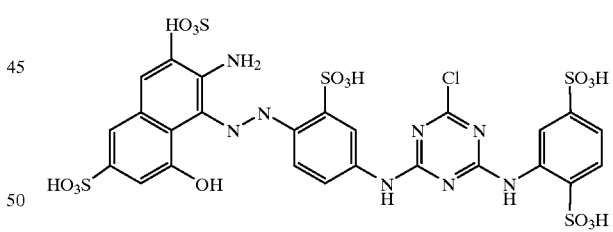

(103)

is obtained. The reactive dye of the formula (103) dyes cotton in red colour shades.

PREPARATION EXAMPLES 2 TO 24

The reactive dyes shown in colume 2 in the following Table 1, which dye cotton in red colour shades, can be obtained in a manner analogous to that described in Preparation Example 1.

TABLE 1

| Preparation Example | Reactive dye |
|---|---|
| 2 | Structure: 2-amino-3,6-disulfo-8-hydroxy-naphthalene coupled via azo to 2-sulfo-4-[(4-chloro-6-(N-methyl-N-(2-sulfoethyl)amino)-1,3,5-triazin-2-yl)amino]phenyl |
| 3 | Structure: 2-amino-3,6-disulfo-8-hydroxy-naphthalene coupled via azo to 2-sulfo-4-[(4-chloro-6-(2-sulfoethylamino)-1,3,5-triazin-2-yl)amino]phenyl |
| 4 | Structure: 2-amino-3,6-disulfo-8-hydroxy-naphthalene coupled via azo to 2-sulfo-4-[(4-chloro-6-(2,4-disulfophenylamino)-1,3,5-triazin-2-yl)amino]phenyl |
| 5 | Structure: 2-amino-3,6-disulfo-8-hydroxy-naphthalene coupled via azo to 2-sulfo-4-[(4-chloro-6-(2-sulfophenylamino)-1,3,5-triazin-2-yl)amino]phenyl |
| 6 | Structure: 2-amino-3,6-disulfo-8-hydroxy-naphthalene coupled via azo to 2-sulfo-4-[(4-chloro-6-(4-methoxy-2,5-disulfophenylamino)-1,3,5-triazin-2-yl)amino]phenyl |

TABLE 1-continued

| Preparation Example | Reactive dye |
|---|---|
| 7 | |
| 8 | |
| 9 | |
| 10 | |
| 11 | |

TABLE 1-continued
| Preparation Example | Reactive dye |
|---|---|
| 12 | 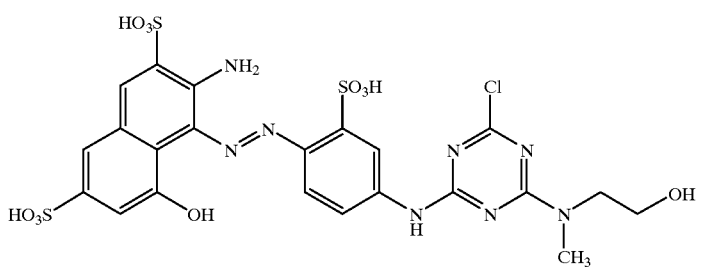 |
| 13 | 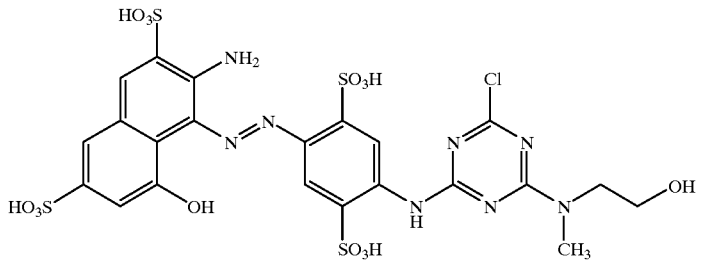 |
| 14 | 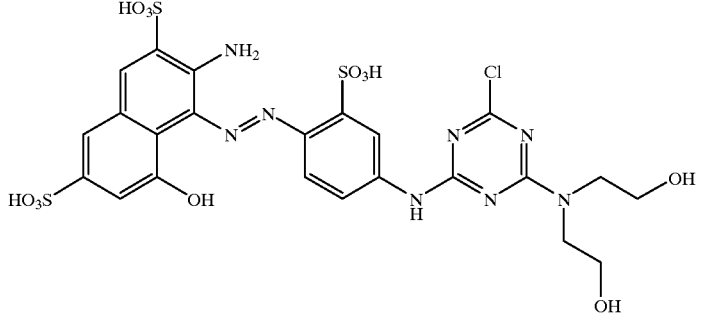 |
| 15 | 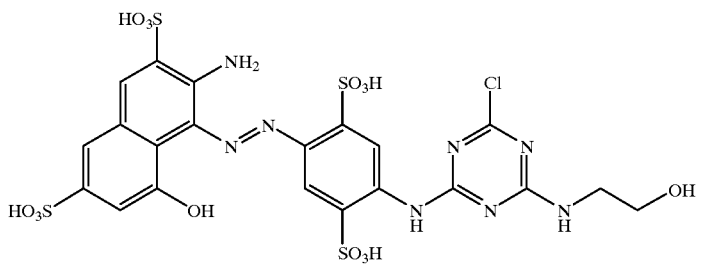 |
| 16 | 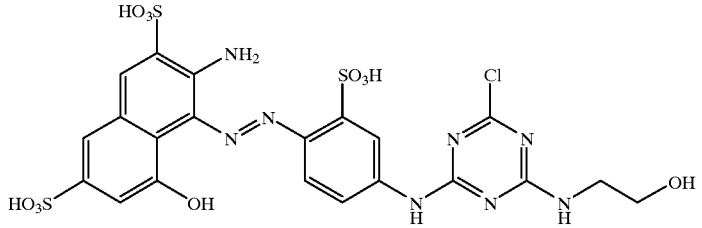 |

TABLE 1-continued

| Preparation Example | Reactive dye |
|---|---|
| 17 | (structure) |
| 18 | (structure) |
| 19 | (structure) |
| 20 | (structure) |
| 21 | (structure) |

TABLE 1-continued

| Preparation Example | Reactive dye |
|---|---|
| 22 | (structure) |
| 23 | (structure) |
| 24 | (structure) |

PREPARATION EXAMPLE 25

28.7 parts of aniline-2,5-disulfonic acid are stirred into 150 parts of water and dissolved under neutral conditions with 2.0 parts of sodium hydroxide. After addition of the customary amount of buffer and wetting agent, the mixture is cooled to 0° C. and a little finely crushed ice is additionally added. 4.7 parts by volume of cyanuric fluoride are then metered in, while stirring rapidly, and the pH is kept at 6.0 by addition of 15% sodium hydroxide solution. The mixture is then subsequently stirred for a short time. A solution of 24.6 parts of the compound of the formula (102), which has first been dissolved under neutral conditions in 300 parts of water at 30° C., is added dropwise to this reaction mass and the pH is kept at 6.0 with 15% sodium hydroxide solution. After the addition, the temperature is kept at 25° C. for one hour. The reaction solution is dialysed and freeze-dried. A reactive dye which, in the form of the free acid, is the compound of the formula (104)

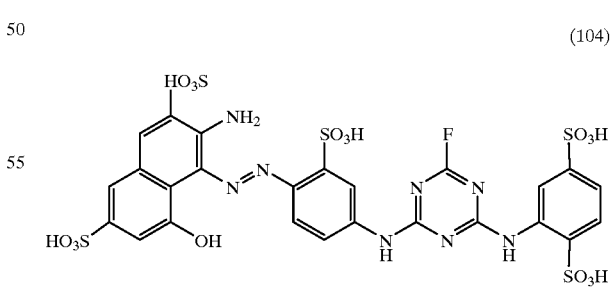

(104)

is obtained. The reactive dye of the formula (104) dyes cotton in red colour shades.

PREPARATION EXAMPLE 26

The following reactive dye of the formula (105)

(105)

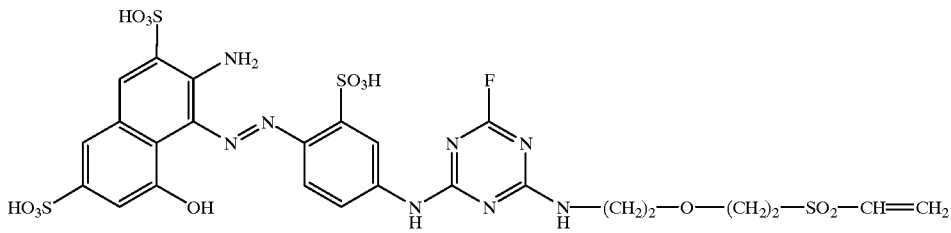

which dyes cotton in red colour shades, can be obtained in a manner analogous to that described in Preparation Example 25.

PREPARATION EXAMPLE 27 a) 345 parts of chlorosufonic add are initially introduced into a sulfonating flask and 85.7 parts of nickel phthalocyanine are introduced at a temperature of 20 to 25° C. in the course of one hour. The mixture is then subsequently stirred for half an hour. The temperature is now increased to 110° C. in the course of two hours and this temperature is maintained for a further 30 minutes. The temperature is then increased to 130° C. in the course of one hour and kept at about 133° C. for a further six hours. The temperature is lowered to 80° C., 59 parts of thionyl chloride are added dropwise at a temperature of 77 to 80° C. in the course of two hours and the temperature is maintained for a further four hours. The reaction mass is cooled. The mass comprises 500 parts. The mass can be kept in stock. As required, an aliquot portion is discharged onto ice-water, filtered off and washed, the nickel phthalocyanine compound, shown in the form of the free acid, of the formula

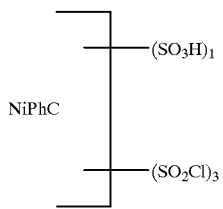

being obtained.

b) 66.6 parts of the reaction mass obtained as described under a) are discharged onto 500 parts of ice and 100 parts of water and the nickel phthalocyanine trisulfochloride-monosulfonic acid is washed free from the adherring acid with a 5% sodium chloride solution.

5.64 parts of 1,3phenylenediamine4-sulfonic add are dissolved in 100 parts of water under neutral conditions with 0.8 parts of sodium hydroxide. 50 parts of fine ice are added to the solution and the nickel phthalocyanine trisulfochloride-monosulfonic acid, which has been washed free from the adherring add as described above, is introduced. The pH is kept at 5.0 and the temperature is kept at 0° C. for 12 hours. The temperature is then increased to 50° C. and maintained for two hours. A content assay shows that 1.0 equivalent of the amine has undergone condensation with the sulfochloride. 20 parts of sodium chloride are added to the reaction solution and the precipitate is filtered off and washed free from the non-condensed phenylenediamine-sulfonic acid with a 10% aqueous sodium chloride solution. An intermediate which, in the form of the free add, is the compound of the formula

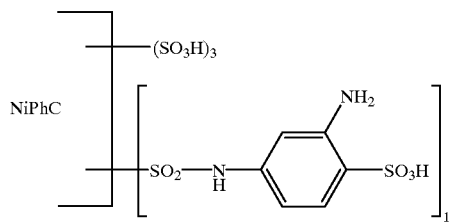

is obtained.

c) 3.7 parts of cyanuric chloride are stirred intensively in 70 parts of ice and 30 parts of water, with the addition of a surface-active agent and 0.2 parts of disodium hydrogen phosphate, for 10 minutes. The paste of the intermediate obtained as described under b) is then introduced and the condensation reaction is carried out at a temperature of 0° C. and a pH of 6.0 for six hours. 1.3 parts of ammonium chloride are then introduced, the temperature is increased to 30 to 35° C. and the mixture is stirred at a pH of 8.0 to 8.5 for a further twelve hours. The resulting solution is desalinated by means of dialysis and evaporated to dryness. 27 parts of a reactive dye which, in the form of the free acid, is the compound of the formula (106)

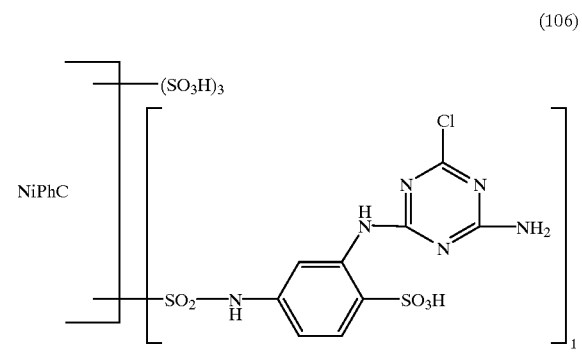

are obtained. The reactive dye of the formula (106) dyes cotton in turquoise blue colour shades.

PREPARATION EXAMPLES 28 TO 34

Reactive dyes of the formula

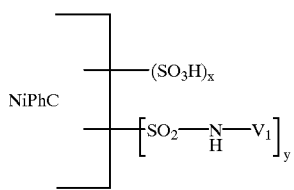

in which $V_1$, x and y are as defined in columns 2 to 4 in the following Table 2, can be obtained in a manner analogous to that described in Preparation Example 27. The reactive dyes shown in the following Table 2 dye cotton in turquoise blue colour shades.

TABLE 2

| Preparation Example | $V_1$ | x | y |
|---|---|---|---|
| 28 | (6-chloro-1,3,5-triazine with NH-(3-methylphenyl) and NH₂ substituents) | 3 | 1 |
| 29 | (6-chloro-1,3,5-triazine with NH-(4-methyl-2-sulfophenyl) and NH₂ substituents) | 3 | 1 |
| 30 | —CH₂—CH₂—NH-(6-chloro-1,3,5-triazine)-NH-(2,5-disulfophenyl) | 3 | 1 |
| 31 | —CH₂—CH₂—NH-(6-chloro-1,3,5-triazine)-NH-(2,4-disulfophenyl) | 3 | 1 |
| 32 | —C₆H₄—CO—NH—(CH₂)₂—SO₂—CH₂CH₂—OSO₃H (para) | 2.75 | 1.25 |
| 33 | —C₆H₄—CO—NH—(CH₂)₂—SO₂—CH₂CH₂—OSO₃H (meta) | 2.5 | 1.5 |
| 34 | —C₆H₄—CO—NH—(CH₂)₂—SO₂—CH₂CH₂—OSO₃H (meta) | 2.2 | 1.8 |

PREPARATION EXAMPLE 35

28.7 parts of aniline-2,5-disulfonic add are stirred into 150 parts of water and dissolved under neutral conditions with 2.0 parts of sodium hydroxide. After addition of the customary amount of buffer and wetting agent, the mixture is cooled to 0° C. and a little finely crushed ice is additionally added. 4.7 parts by volume of cyanuric fluoride are then metered in, while stirring rapidly, and the pH is kept at 6.0 by addition of 15% sodium hydroxide solution. The mixture is then subsequently stirred for a short time. A hot, neutral 10% solution of 49.0 parts of the compound of the formula

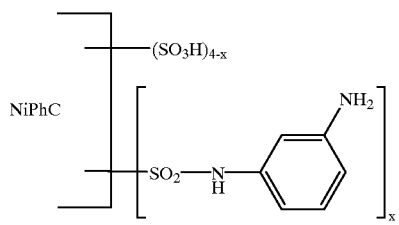

(x=1.5; preparation analogous to Preparation Example 27a) and b)) is added dropwise to this reaction mass at 10 to 15° C., the pH being kept at 7.0 with 15% sodium hydroxide solution. After the addition, the temperature is allowed to rise to about 25° C., until the uptake of alkali has ended. The reaction solution is and freeze-dried. A reactive dye which, in the form of the free add, is the compound of the formula (107)

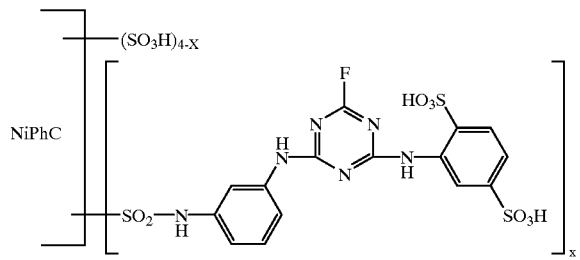

(107)

is obtained. The reactive dye of the formula (107) dyes cotton in turquoise blue colour shades.

APPLICATION EXAMPLE 1 a) Mercerized cotton-satin is padded with a liquor comprising 40 g/l of sodium carbonate and 100 g/l of urea (liquor pick-up 70%) and dried.

b) On the cotton-satin pretreated according to step a), on the same substrate area, an ink A comprising 15% by weight of the reactive dye of the formula

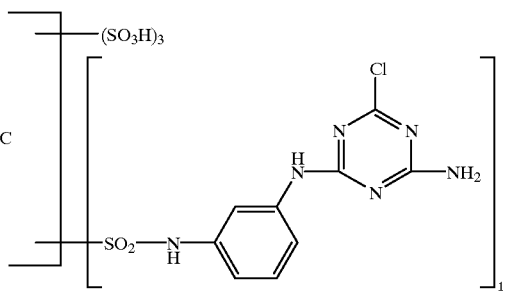

(108)

20% by weight of 1,2-propylene glycol and 65% by weight of water, and an ink B comprising 15% by weight of the reactive dye of the formula

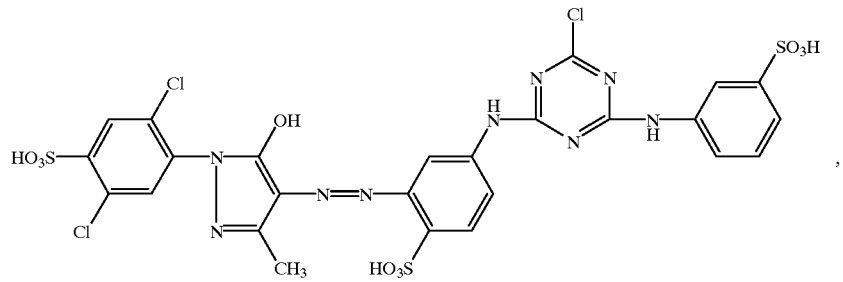

(109)

20% by weight of 1,2-propylene glycol and 65% by weight of water, are printed with two different drop on demand piezo ink jet heads. The print is dried completely and fixed in saturated steam at 102° C. for 8 minutes, rinsed cold, washed out at the boil, rinsed again and dried. A green print which is fast to washing and has a very high fastness to light is obtained.

If the procedure is as described in Application Example 1, but an ink A which comprises 15% by weight of one of the reactive dyes according to Preparation Examples 27 and 29 to 35 instead of 15% by weight of the reactive dye of the formula (108) is used, analogous prints are obtained.

If the procedure is as described in Application Example 1, but an ink B which comprises 11% by weight of the reactive dye of the formula (109) and 4% by weight of the reactive dye of the formula (112) instead of 15% by weight of the reactive dye of the formula (109) is used, analogous prints are obtained.

APPLICATION EXAMPLE 2 a) Causficized viscose fabric is padded with a liqour comprising 40 g/l of sodium carbonate and 150 g/l of urea (liquor pick-up 70%) and dried.

b) On the viscose fabric pretreated according to step a), on the same area of substrate, an ink A comprising 15% by weight of the reactive dye of the formula (108), 20% by weight of 1,2-propylene glycol and 65% by weight of water, and an ink B comprising 15% by weight of the reactive dye of the formula

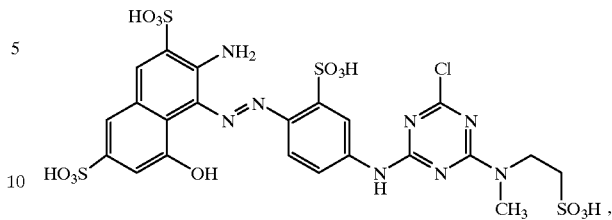

(111)

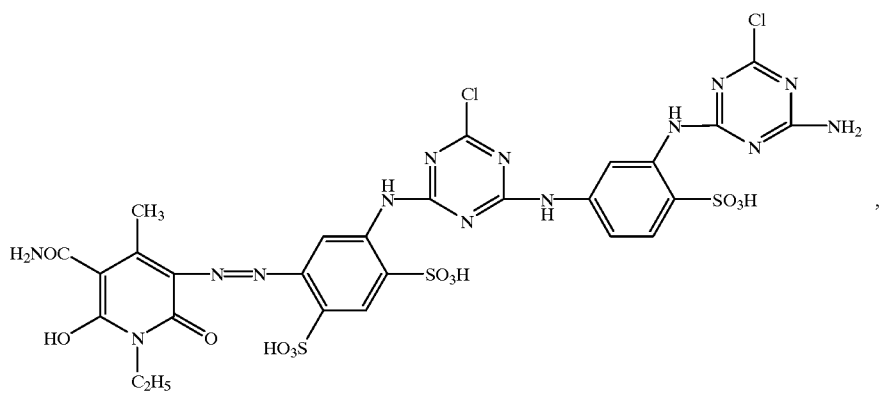

(110)

20% by weight of 1,2-propylene glycol and 65% by weight of water, are printed with two different drop on demand piezo ink jet heads. The print is dried completely and fixed in saturated steam at 102° C. for 8 minutes, rinsed cold, washed out at the boil, rinsed again and dried. A green print which is fast to washing and has a very high fastness to light is obtained.

If the procedure is as in Application Example 2 but an ink A which comprises 15% by weight of one of the reactive dyes according to Preparation Examples 27 and 29 to 35 instead of 15% by weight of the reactive dye of the formula (108) is used, analogous prints are obtained.

APPLICATION EXAMPLE 3 a) Mercerized cotton-satin is padded with a liquor comprising 40 g/l of sodium carbonate and 100 g/l of urea (liquor pick-up 70%) and dried.

b) On the cotton-satin pretreated according to step a), on the same area of substrate, an ink A comprising 15% by weight of the reactive dye of the formula (108), 20% by weight of 1,2-propylene glycol and 65% by weight of water, and an ink B comprising 15% by weight of the reactive dye of the formula 20% by weight of 1,2-propylene glycol and 65% by weight of water, are printed with two different drop on demand piezo ink jet heads. The print is dried completely and fixed in saturated steam at 102° C. for 8 minutes, rinsed cold, washed out at the boil, rinsed again and dried. A violet print which is fast to washing and has a very high fastness to light is obtained.

If the procedure is as described in Application Example 3, but an ink A which comprises 15% by weight of one of the reactive dyes according to Preparation Examples 27 and 29 to 35 instead of 15% by weight of the reactive dye of the formula (108) Is used, analogous prints are obtained.

If the procedure is as described in Application Example 3, but an ink B which comprises 15% by weight of one of the reactive dyes according to Preparation Examples 1 and 3 to 26 instead of 15% by weight of the reactive dye of the formula (111) is used, analogous prints are obtained.

APPLICATION EXAMPLE 4 a) Mercerized cotton-satin is padded with a liquor comprising 40 g/l of sodium carbonate and 100 g/l of urea (liquor pick-up 70%) and dried.

b) On the cotton-satin pretreated according to step a), on the same area of substrate, an ink A comprising 15% by weight of the reactive dye of the formula (108), 20% by weight of 1,2-propylene glycol and 65% by weight of water, an ink B comprising 15% by weight of the reactive dye of the formula (112)

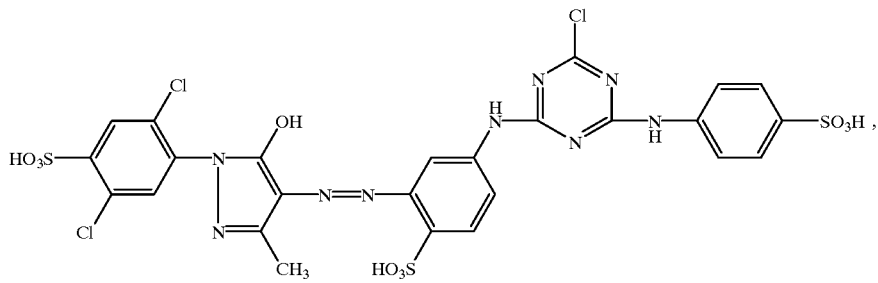

20% by weight of 1,2-propylene glycol and 65% by weight of water, and an ink C comprising 5% by weight of the reactive dye of the formula (113)

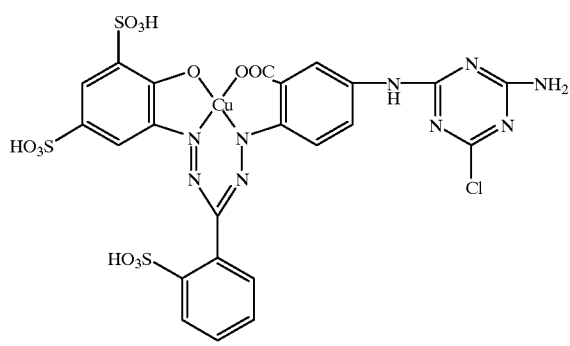

and 10% by weight of the reactive dye of the formula (114)

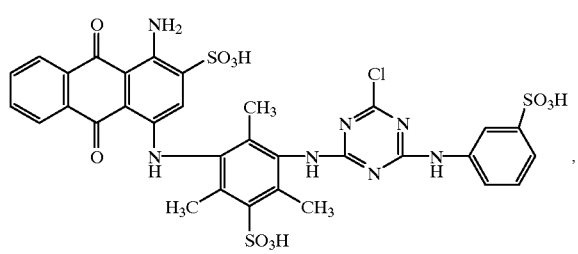

20% by weight of 1,2-propylene glycol and 60% by weight of water, are printed with three different drop on demand piezo ink jet heads. The print is dried completely and fixed in saturated steam at 102° C. for 8 minutes, rinsed cold, washed out at the boil, rinsed again and dried. A green print which is fast to washing and has a very high fastness to light is obtained.

If the procedure is as described in Application Example 4, but an ink which comprises 15% by weight of one of the reactive dyes according to Preparation Examples 27 and 29 to 35 instead of 15% by weight of the reactive dye of the formula (108) is used, analogous prints are obtained.

If the procedure is as described in Application Example 4, but an ink B which comprises 11% by weight of the reactive dye of the formula (109) and 4% by weight of the reactive dye of the formula (112) instead of 15% by weight of the reactive dye of the formula (112) is used, analogous prints are obtained.

APPLICATION EXAMPLE 5

1.8 parts of a mixture of the reactive dyes of the formulae (109) and (112) in a ratio of 4:1 and 3 parts of the reactive dye of the formula (108)

are stirred, with rapid stirring, into 100 parts of a stock thickener comprising 50 parts of 5% sodium alginate thickener, 10 parts of urea, 1part of sodium m-nitrobenzenesulfonate, 1.5 parts of calcined sodium carbonate and 32.7 parts of water. Mercerized cotton-satin is printed with the printing paste thus obtained and dried and the resulting printed material is fixed in saturated steam at 102° C. for 8 minutes. The material is rinsed cold, washed out at the boil, rinsed again and dried. A green print which is fast to washing and has a very high fastness to light is obtained.

If the procedure is as described in Application Example 5, but 3 parts of one of the reactive dyes according to Preparation Examples 27 and 29 to 35 are used instead of 3 parts of the reactive dye of the formula (108), analogous prints are obtained.

APPLICATION EXAMPLE 6

0.8 part of the reactive dye of the formula (110) and 3 parts of the reactive dye of the formula (108)

are stirred, with rapid stirring, into 100 parts of a stock thickener comprising 50 parts of 5% sodium alginate thickener, 15 parts of urea, 1part of sodium m-nitrobenzenesulfonate, 1.5 parts of calcined sodium carbonate and 28.7 parts of water. Causticized viscose fabric is printed with the printing paste thus obtained and dried and the resulting printed material is fixed in saturated steam at 102° C. for 8 minutes. The material is rinsed cold, washed out at the boil, rinsed again and dried. A green print which is fast to washing and has a very high fastness to light is obtained.

If the procedure is as described in Application Example 6, but 3 parts of one of the reactive dyes according to Preparation Examples 27 and 29 to 35 are used instead of 3 parts of the reactive dye of the formula (108), analogous prints are obtained.

APPLICATION EXAMPLE 7

0.8 part of the reactive dye of the formula (111) and 3 parts of the reactive dye of the formula (108)

are stirred, with rapid stirring, into 100 parts of a stock thickener comprising 50 parts of 5% sodium alginate thickener, 10 parts of urea, 1part of sodium m-nitrobenzenesulfonate, 1.5 parts of calcined sodium carbonate and 33.7 parts of water. Mercerized cotton-satin is printed with the printing paste thus obtained and dried and the resulting printed material is fixed in saturated steam at 102° C. for 8 minutes. The material is rinsed cold, washed out at the boil, rinsed again and dried. A violet print which is fast to washing and has a very high fastness to light is obtained.

If the procedure is as described in Application Example 7, but 3 parts of one of the reactive dyes according to Preparation Examples 27 and 29 to 35 are used instead of 3 parts of the reactive dye of the formula (108), analogous prints are obtained.

If the procedure is as described in Application Example 7, but 0.8 part of one of the reactive dyes according to Preparation Examples 1 and 3 to 26 is used instead of 0.8 part of the as reactive dye of the formula (111), analogous prints are obtained.

APPLICATION EXAMPLE 8

1.8 parts of a mixture of the reactive dyes of the formulae (109) and (112) in a ratio of 4:1 and 3 parts of the reactive dye of the formula (108)

are dissolved in 50 parts of water. 50 parts of a solution which comprises, per litre, 5 g of sodium hydroxide and 20 g of calcined sodium carbonate are added. A bleached cotton fabric is padded with the solution thus obtained such that it increases by 70% of its weight, and is wound up onto a roll. The cotton fabric is stored at room temperature in this manner for 6 hours. Thereafter, the dyed goods are rinsed, washed out at the boil, rinsed again and dried. A green dyeing which is fast to washing and has a very high fastness to light is obtained. If the procedure is as described in Application Example 8 but 3 parts of one of the reactive dyes according to Preparation Examples 27 and 29 to 35 are used instead of 3 parts of the reactive dye of the formula (108), analogous dyeings are obtained.

APPLICATION EXAMPLE 9

1.8 parts of the reactive dye of the formula (109) and 3 parts of the reactive dye of the formula (108)

are dissolved in 100 parts of water. A bleached cotton fabric is padded with the solution thus obtained such that it increases by 70% of its weight, and is dried. The fabric is then padded with a solution which comprises, per litre, 4 g of sodium hydroxide and 300 g of sodium chloride and the dyeing is steamed in saturated steam at 102° C. for 30 seconds. Thereafter, the dyed goods are rinsed, washed out at the boil, rinsed again and dried. A green dyeing which is fast to washing and has a very high fastness to light is obtained.

If the procedure is as described in Application Example 9, but 3 parts of one of the reactive dyes according to Preparation Examples 27 and 29 to 35 are used instead of 3 parts of the reactive dye of the formula (108), analogous dyeings are obtained.

APPLICATION EXAMPLE 10

1.0 part of the reactive dye of the formula (115)

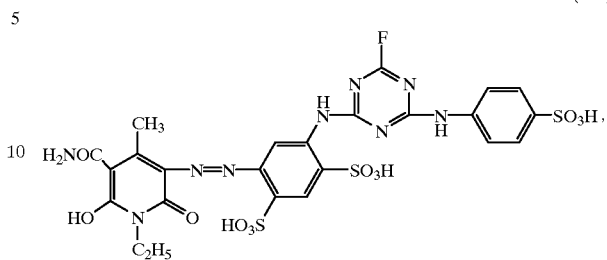

and 3 parts of the reactive dye according to Preparation Example 18 are dissolved in 200 parts of water. 800 parts of a solution which comprises, per litre, 50 g of Glauber's salt are added. 100 parts of a bleached cotton knitted fabric are introduced into this dyebath at 40° C. After 45 minutes, 50 parts of a solution which comprises, per litre, 16 g of sodium hydroxide and 20 g of calcined sodium carbonate are added. The temperature of the dyebath is kept at 40° C. for a further 45 minutes. Thereafter, the dyed goods are rinsed, washed out at the boil, rinsed again and dried. A green dyeing which is fast to washing and has a very high fastness to light is obtained.

If the procedure is as described in Application Example 10 but 3 parts of one of the reactive dyes according to Preparation Examples 33 or 34 are used instead of 3 parts of the reactive dye according to Preparation Example 32, analogous dyeings are obtained.

APPLICATION EXAMPLE 11

2.54 parts of the reactive dye according to Preparation Example 11 are dissolved in 100 parts of distilled water and the solution is filtered. The ink thus obtained is printed by means of a drop on demand ink jet printer onto a commercially available ink jet paper or photo paper or a glossy film (for example Epson Glossy Film). The resulting print in a brilliant red shade has a very good fastness to light If the procedure is as described in Application Example 11 but 2.54 parts of one of the reactive dyes according to Preparation Examples 12 or 16 are used instead of 2.54 parts of the reactive dye according to Preparation Example 11, prints with a very good fastness to light are likewise obtained.

What is claimed is:

1. A reactive dye of the formula (4a)

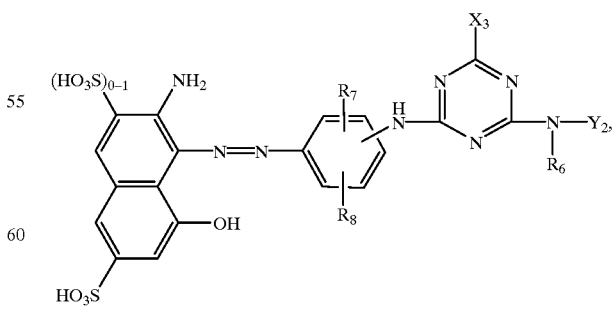

in which $R_6$ is hydrogen or $C_1$–$C_4$alkyl which is unsubstituted or substituted by hydroxyl, sulfo or sulfato, $R_7$ is sulfo,
$R_8$ is hydrogen,
$X_3$ is fluorine and
$Y_2$ is hydrogen, $C_1$–$C_8$alkyl which is unsubstituted or substituted by hydroxyl, sulfo or sulfato and is uninterrupted or interrupted by oxygen, or the radical —N($R_6$)—$Y_2$ is morpholino.

2. A process for the preparation of a reactive dye according to claim 1, which comprises subjecting a compound of the formula

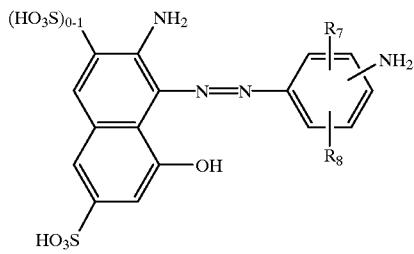

(18)

to a condensation reaction with a compound of the formula

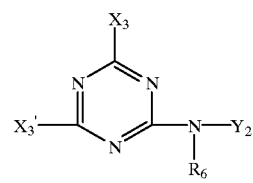

(19)

or subjecting a compound of the formula (18) to a condensation reaction with cyanuric fluoride and then subjecting the resulting product to a condensation reaction with a compound of the formula

(20)

in which
$R_6$, $R_7$, $R_8$, $Y_2$ and $X_3$ are as defined in claim 1 and
$X_3{'}$ is as defined for $X_3$ in claim 1.

3. A process for dyeing or printing paper, films of plastic or fibre material containing hydroxyl groups or containing nitrogen, which process comprises the step of applying to said materials a tinctorially effective amount of a reactive dye according to claim 1.

4. A process for printing paper, films of plastic or fibre material containing hydroxyl groups or containing nitrogen in accordance with the ink-jet printing process, wherein said materials are printed with an ink comprising a reactive dye of formula

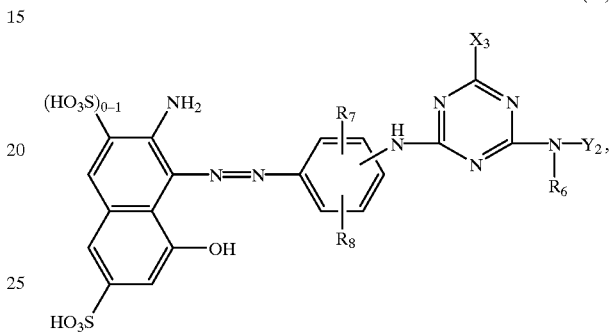

(4a)

in which $R_6$, $R_7$, $R_8$, $X_3$ and $Y_2$ are as defined in claim 1

$R_6$ is hydrogen or $C_1$–$C_4$alkyl which is unsubstituted or substituted by hydroxyl, sulfo or sulfato, $R_7$ and $R_8$ independently of one another are hydrogen, $C_1$–$C_4$alkyl, $C_1$–$C_4$alkoxy, halogen, carboxyl or sulfo, $R_7$ and $R_8$ independently of one another are hydrogen, $C_1$–$C_4$alkyl, $C_1$–$C_4$alkoxy, halogen, carboxyl or sulfo, $X_3$ is fluorine and $Y_2$ is hydrogen, $C_1$–$C_8$alkyl which is unsubstituted or substituted by hydroxyl, sulfo or sulfato and is uninterrupted or interrupted by oxygen, or phenyl or naphthyl which are unsubstituted or substituted by $C_1$–$C_4$alkyl, $C_1$–$C_4$alkoxy, halogen, carboxyl or sulfo, or the radical —N($R_6$)–$Y_2$ is morpholino.

* * * * *